Figure 1:
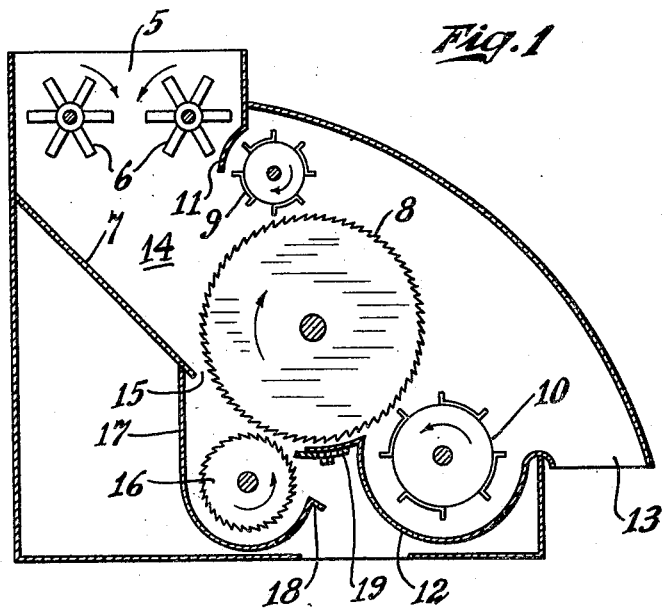

April 25, 1933.    T. ELLIOTT    1,905,632

HULL EXTRACTOR

Filed April 28, 1930

INVENTOR
Thomas Elliott

Patented Apr. 25, 1933

1,905,632

UNITED STATES PATENT OFFICE

THOMAS ELLIOTT, OF BIRMINGHAM, ALABAMA, ASSIGNOR TO CONTINENTAL GIN COMPANY, A CORPORATION OF DELAWARE

HULL EXTRACTOR

Application filed April 28, 1930. Serial No. 447,876.

My invention relates to apparatus for the extraction of hulls, trash and the like from cotton or other fibrous material.

My invention pertains more particularly to that class of hull extractors which comprise what I term a saw assembly, which assembly comprises in its essence a rotatable saw or toothed cylinder associated with guide means to present the raw material thereto in a treatment chamber, a stripper roller to prevent hulls and the like passing from said chamber to a doffer along with the fiber, and a doffer to strip the fiber from the cylinder teeth.

In such machines, particularly as adapted to the treatment of cotton, an ideal operation would be obtained if the hulls and the like could be withdrawn so rapidly from the treatment chamber that they would not tend to choke the machine nor be cut up by the saws and yet they would not carry off with them any appreciable amount of the cotton fiber. Obviously, however, the greater and freer the avenue of escape for the hulls from treatment by the saw assembly the greater will be the amount of cotton that will pass out with them and be lost. Therefore, the best hull extracting apparatus now on the market has been designed to permit an appreciable amount of cotton to pass out of the treatment chamber with the freely escaping hulls and has concerned itself with providing an efficient and inexpensive means for recapturing this escaping cotton. The chief advantages of such an arrangement lie in the fact that the rapid removal of the hulls not only eliminates any choking of the machine and thus maintains its capacity output of fiber, but it also prevents the lowering of the grade of the fiber by reason of the fact that the hulls are so quickly removed that they are not broken or cut up to any appreciable extent and hence small particles thereof do not become intermingled with the fiber to greatly reduce its grade and commercial value.

My present invention is chiefly concerned with the recapture of the cotton or fiber passing out with the hulls from any suitable saw assembly preferably one designed to permit a free escape of hulls from its treatment chamber and I propose to utilize in effecting such recapture a rotatable toothed element such as a saw cylinder, which I term the retreatment cylinder. I associate with such retreatment cylinder means arranged to present the escaping hulls and cotton thereto and to prevent the escape of the hulls therefrom until all adhering cotton has been removed. In its preferred embodiment, the means for controlling the escape of the cleaned hulls from the retreatment cylinder is a curved hull board which is capable of almost indefinite use since it has no part subject to wear or destruction from operation.

Preferably the retreatment cylinder is adapted to be doffed by the main saw cylinder, thereby rendering unnecessary any separate doffing means for the retreatment cylinder, which however may be provided if desired.

The retreatment cylinder is of much smaller diameter than the main saw so as to have a relatively low peripheral speed and is rotatable oppositely thereto so that its upgoing teeth will be properly disposed to be doffed by the main saw.

In its simplest embodiment, my present invention contemplates two oppositely rotated saw cylinders, one arranged above the other and associated with hull board means which will first deliver cotton and hulls to the upgoing teeth of the main saw and then to the downgoing teeth of the retreatment saw, the board extending to a point opposite to upgoing teeth of the retreatment saw to there provide a free edge over which the hulls will pass responsive to the action of the retreatment saw only after they have been cleaned of any adhering or associated cotton. An adjustable stripper may be provided for the retreatment saw.

My invention further comprises the novel details of construction and arrangements of parts, which in their preferred embodiments only are hereinafter more particularly described and claimed, reference being had to the accompanying drawing which forms a part of this specification, and in which:—

Figure 2:
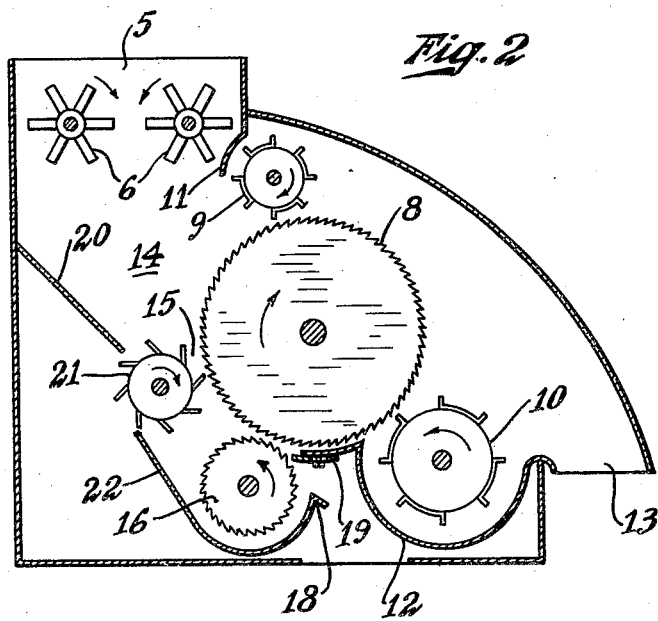

Fig. 1 and Fig. 2 are corresponding vertical transverse sectional views through hull extractors embodying my invention but provided with different hull board arrangements. The drive mechanism for the rotatable parts is omitted but their direction of rotation is indicated by arrows.

Corresponding reference numerals refer to corresponding parts throughout.

Fig. 1 shows an extractor casing having an inlet 5 for the raw material to be treated, with feed rollers 6 working therein and delivering the material to an inclined hull board 7 which will direct it into engagement with the teeth of a main saw cylinder 8 rotating clockwise and having associated with it a stripper roller 9 and a doffing roller 10, the former having a suitable guard 11 and the latter a guard 12. The cotton is discharged through an outlet 13 to the gin or elsewhere and the hulls and trash escape from the treatment chamber 14 of the main saw assembly through an opening 15 between the hull board and the saw cylinder.

This opening 15 is large enough to permit a free escape of hulls and, to prevent too great a loss of cotton with the hulls, I provide the recapturing means which will now be described.

Below the main cylinder 8 I provide a retreatment saw cylinder 16, preferably of smaller diameter than the saw cylinder 8 and driven in the opposite direction thereto with its periphery disposed close enough to the saw 8 to be doffed thereby. A hull guide 17 will cause the hulls and cotton escaping through the opening 15 to pass between such guide and the downgoing side of the retreatment cylinder 16 and this guide extends under the retreatment cylinder 16 and has its free discharge edge 18 disposed opposite to and spaced from the upgoing side of the retreatment cylinder. The hulls that escape over this edge pass out through a bottom opening from the casing and the cotton engaged by the retreatment cylinder will be doffed from the teeth on its upgoing side by the saw 8. A stripper means such as the plate 19, carried by the guard 12 and so mounted as to be adjustable toward the saw cylinder 16, is provided to knock back hulls tending to pass over with the cotton adhering to the teeth of the saw 16 and that would thus be brought into contact with the main saw 8 and returned to the treatment chamber 14.

In operation, hulls, trash and cotton falling between the retreatment saw and the hull guide 17 will be driven by said saw away from position below the opening 15 and therefore they will not accumulate there so as to choke the extractor. The hulls will also be driven around under the retreatment saw cylinder 16 and will tend to collect between the teeth on its upgoing side and the discharge end of the guide 17. The saw teeth rising through the free hulls will strip all cotton therefrom without cutting up the hulls.

When the hulls have been cleaned of cotton they are ready to be kicked over the edge 18 or forced thereover by the retreatment saw due to their accumulation in the space between the retreatment saw and the edge 18. The spacing of the edge 18 from the retreatment saw cylinder and the height to which it rises above the bottom level of the said cylinder can be readily adjusted to produce the most efficient treatment on any particular raw material.

The apparatus described in Fig. 2 differs from Fig. 1 only in that a hull board 20 is substituted for the hull board 7 and a picker roller 21 disposed to receive the cotton and hulls from the hull board 20 and deliver same to the main saw cylinder 8. The hull guide 22 for the retreatment cylinder 16 extends from below this picker roller 21 and around under the retreatment saw and terminates in the free hull escape edge 18. The operation of both forms illustrated is the same, and it is to be noted that apart from the guiding action of the lower hull board 17 or 22 on the hulls they are left free to move with and be driven by the retreatment cylinder until they escape, and no obstruction is interposed to the escape of a hull except that it must be driven over the edge 18 against the force of gravity and the resistance of any hulls above it.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. The combination with a hull extractor assembly comprising a rotatable toothed cylinder, means to guide cotton and hulls thereto, and a stripper means and a doffer means associated with said cylinder, of a second rotatable toothed cylinder disposed in position to retreat cotton and hulls escaping between said guide means and the first mentioned cylinder, a free unobstructed guide for said escaping hulls extending about the under side of said retreating cylinder and terminating opposite to and spaced from its upgoing side, said first mentioned toothed cylinder being disposed in position and driven so as to doff said retreating cylinder.

2. In a hull extractor, a main rotatable saw cylinder, means to guide material thereto, agencies to strip and doff said cylinder, and means to recapture cotton escaping with hulls between said guide means and cylinder comprising a retreatment saw cylinder oppositely rotatable to said main cylinder and disposed to be doffed thereby, and means to cause said escaping hulls to be driven by said retreatment cylinder under it, said means being adapted to permit the free escape of the hulls upwardly on the upgoing side of said retreatment cylinder.

3. In a hull extractor, a main rotatable saw cylinder, means to guide material thereto, agencies to strip and doff said cylinder, and means to recapture cotton escaping with hulls between said guide means and cylinder comprising a retreatment saw cylinder oppositely rotatable to said main cylinder and disposed to be doffed thereby, and a concave hull board disposed to guide hulls under said retreatment cylinder and permit their free escape upwardly responsive to the action of upgoing teeth of said retreatment cylinder.

4. In a hull extractor, a main rotatable saw cylinder, means to guide material thereto, agencies to strip and doff said cylinder, and means to recapture cotton escaping with hulls between said guide means and cylinder comprising a retreatment saw cylinder oppositely rotatable to said main cylinder and disposed to be doffed thereby, a concave hull board disposed to guide hulls under said retreatment cylinder and permit their free escape upwardly responsive to the action of upgoing teeth of said retreatment cylinder, and a stripper means to intercept the return of hulls by the retreatment cylinder to said main cylinder 5. The combination in a hull extractor, of a main rotatable saw cylinder, a smaller oppositely rotatable retreatment saw cylinder, means to guide hulls and cotton to said main saw cylinder, an unobstructed concave hull board for hulls and cotton falling from said guide means, which hull board extends about under said retreatment cylinder and has its hull discharge edge under the main cylinder and on the upgoing side of the retreatment cylinder, and agencies to doff and to strip said main cylinder.

6. The combination in a hull extractor, of a main rotatable saw cylinder, a smaller oppositely rotatable retreatment saw cylinder, means to guide hulls and cotton to said main saw cylinder, an unobstructed concave hull board for hulls and cotton falling from said guide means, which hull board extends about under said retreatment cylinder and has its hull discharge edge under the main cylinder and on the upgoing side of the retreatment cylinder, and agencies to strip and doff the main cylinder.

7. In a hull extractor, a main rotatable saw cylinder having stripping and doffing means and a hull board spaced from the cylinder to permit a free escape of hulls, a smaller saw cylinder mounted under said main cylinder in position to receive the escaping hulls on its downgoing side and to have any cotton its teeth collect from among the hulls doffed on its upgoing side by said main cylinder, and an arcuate hull board for said escaping hulls extending about under said smaller saw cylinder with its free unobstructed hull discharge edge rising substantially above the bottom level of said smaller cylinder.

8. The combination with a hull extractor mechanism including hull board means past which hulls with some adhering or accompanying cotton are discharged, of means to recapture such cotton comprising a rotatable toothed cylinder disposed in position to engage the said discharged cotton and discharged hulls on its downgoing side, means to cause said cylinder to carry the hulls and adhering cotton under and to eject said hulls on its upgoing side, and agencies to strip and doff the recaptured cotton from the upgoing side of said toothed cylinder above the hull discharge.

In testimony whereof I affix my signature.
THOMAS ELLIOTT.